United States Patent
Nakagawa (10) Patent No.: US 10,025,750 B2
(45) Date of Patent: Jul. 17, 2018

(54) TRANSMISSION DEVICE, CONTROLLER, AND SYSTEM COMPRISING TRANSMISSION DEVICE AND CONTROLLER

(71) Applicant: Kabushiki Kaisha Toshiba, Minato-ku, Tokyo (JP)

(72) Inventor: Katsutoshi Nakagawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/119,312

(22) PCT Filed: Mar. 30, 2015

(86) PCT No.: PCT/JP2015/059998
§ 371 (c)(1),
(2) Date: Aug. 16, 2016

(87) PCT Pub. No.: WO2015/159699
PCT Pub. Date: Oct. 22, 2015

(65) Prior Publication Data
US 2017/0124017 A1   May 4, 2017

(30) Foreign Application Priority Data
Apr. 14, 2014  (JP) .................................. 2014-083067

(51) Int. Cl.
*G06F 13/20* (2006.01)
*G06F 13/42* (2006.01)
*G06F 13/16* (2006.01)

(52) U.S. Cl.
CPC ...... *G06F 13/4282* (2013.01); *G06F 13/1663* (2013.01)

(58) Field of Classification Search
None
See application file for complete search history.

(56) References Cited

U.S. PATENT DOCUMENTS 5,771,356 A * 6/1998 Leger .................... G06F 13/387
                                                        709/231
5,789,936 A * 8/1998 Kim ........................ H04L 43/00
                                                         326/21

(Continued)

FOREIGN PATENT DOCUMENTS

JP   H04-357548 A   12/1992
JP   H08-147178 A    6/1996
(Continued)

OTHER PUBLICATIONS

International Search Report received in PCT Application No. PCT/JP2015/059998, dated Jun. 16, 2015.

(Continued)

*Primary Examiner* — Elias Mamo
(74) *Attorney, Agent, or Firm* — Knobbe, Martens, Olson & Bear, LLP (57) ABSTRACT

According to an embodiment, a transmission device is connected to a controller via a system bus. The transmission device includes a first transmission control module and a control module. The first transmission control module controls transmission via the system bus. The control module does not perform but withholds an operation involving a use of shared system resources including the system bus and performs the withheld operation when notified of an availability of the shared system resources from the controller.

6 Claims, 8 Drawing Sheets

(56) References Cited

U.S. PATENT DOCUMENTS

| | | | | |
|---|---|---|---|---|
| 5,793,994 | A * | 8/1998 | Mitchell | G06F 13/4234 |
| | | | | 709/213 |
| 6,438,710 | B1 * | 8/2002 | Walsh | G06F 11/1441 |
| | | | | 711/166 |
| 6,658,493 | B1 * | 12/2003 | Fujioka | G06F 13/4269 |
| | | | | 710/1 |
| 7,774,529 | B2 | 8/2010 | Ishino et al. | |
| 8,275,926 | B2 | 9/2012 | Day | |
| 9,329,998 | B2 | 5/2016 | Koike et al. | |
| 2005/0005048 | A1 * | 1/2005 | Iwata | G06F 13/26 |
| | | | | 710/107 |
| 2009/0013115 | A1 | 1/2009 | Ishino et al. | |
| 2012/0054403 | A1 | 3/2012 | Day | |
| 2014/0173202 | A1 | 6/2014 | Koike et al. | |

FOREIGN PATENT DOCUMENTS

| | | |
|---|---|---|
| JP | 2005-159705 A | 6/2005 |
| JP | 2009-032248 A | 2/2009 |
| JP | 2012-048707 A | 3/2012 |
| WO | WO 2013/027261 A1 | 2/2013 |

OTHER PUBLICATIONS

Written Opinion received in PCT Application No. PCT/JP2015/059998, dated Jun. 16, 2015.

\* cited by examiner

FIG.2

| SOCKET NUMBER 401 | RECEPTION BUFFER ADDRESS 402 | RECEPTION SIZE 403 |
|---|---|---|
| SOCKET NUMBER N1 | | |
| SOCKET NUMBER N2 | | |
| . | | |
| . | | |
| SOCKET NUMBER Nn | | |

TRANSMISSION DEVICE, CONTROLLER, AND SYSTEM COMPRISING TRANSMISSION DEVICE AND CONTROLLER

CROSS-REFERENCE TO RELATED APPLICATIONS

This application is national stage application of International Application No. PCT/JP2015/059998, filed Mar. 30, 2015, which designates the United States, incorporated herein by reference, and which is based upon and claims the benefit of priority from Japanese Patent Application No. 2014-083067, filed Apr. 14, 2014, the entire contents of which are incorporated herein by reference.

FIELD

Embodiments described herein relate generally to a transmission device, a controller, and a system including the transmission device and the controller.

BACKGROUND

Conventionally, a system is known in which a transmission device is connected to a system bus of a controller and has the function to process communication commands from the controller. In such a system, when the operation of the transmission device and the task of the controller are asynchronously carried out, there may be an overlap in their individual timings at which the transmission device and the controller use shared system resources (such as a system bus and shared memories). Such an overlap may cause a delay in the execution of the task by the controller. As a general countermeasure thereto, for example, the transmission device sets a waiting time at key points of the operation which occupies the shared system resources over a long period of time and temporarily yields the shared system resources to the controller during the waiting time.

However, even if the above countermeasure is taken, a delay may still occur in the task execution by the controller during a time taken for yielding the shared system resources.

It is an object of the present invention to provide a transmission device, a controller, and a system including the transmission device and the controller that enable the controller to execute a task without a delay, unaffected by the operation by the transmission device.

DETAILED DESCRIPTION

According to an embodiment, a transmission device is connected to a controller via a system bus. The transmission device comprises a first transmission control module and a control module. The first transmission control module controls transmission via the system bus. The control module does not perform but withholds an operation involving a use of shared system resources including the system bus and performs the withheld operation when notified of an availability of the shared system resources from the controller.

First Embodiment

Figure 1:
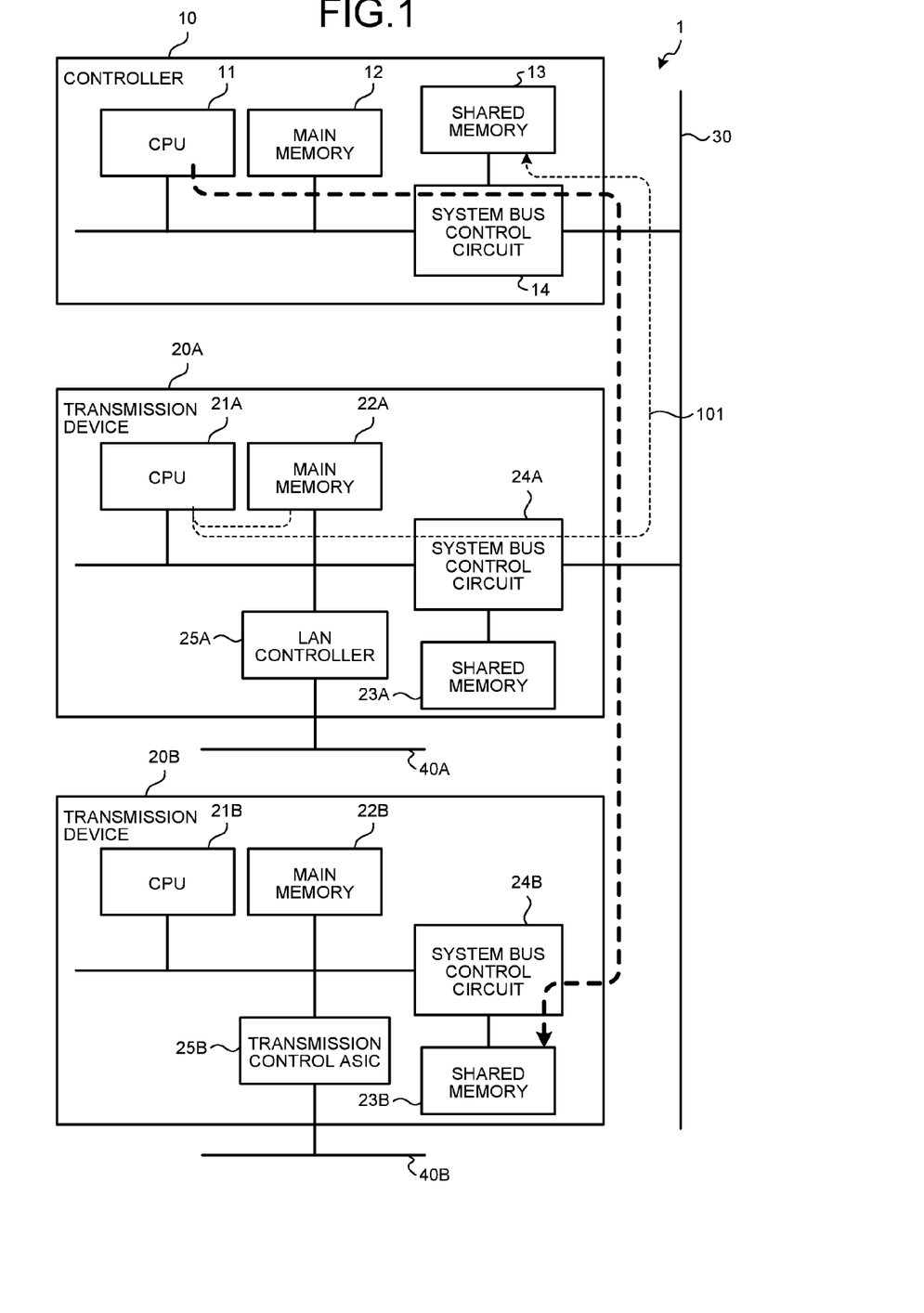
FIG. 1 is a block diagram illustrating an overall configuration (overview) of a system including a transmission device and a controller according to a first embodiment.

FIG. 1 is a block diagram illustrating an overall configuration (overview) of a system including a transmission device and a controller according to a first embodiment.

In a system 1 illustrated in FIG. 1 according to the first embodiment, a plurality of (in FIG. 1, two) transmission devices 20A and 20B is connected to one or more (in FIG. 1, one) controllers 10 via a system bus 30.

The controller 10 includes a CPU 11, a main memory 12, and a system bus control circuit 14 connected via an internal bus of the controller 10, and a shared memory 13 connected to the system bus control circuit 14. The shared memory 13 is a rewritable memory accessible from within the controller 10 or from other devices. The system bus control circuit 14 is a circuit for controlling transmission among the system bus 30, the internal bus of the controller 10, and a bus connected to the shared memory 13. The CPU 11 and the main memory 12 function as a so-called computer. At the time of booting, a control program including a plurality processing modules is loaded on the main memory 12 from a ROM (not illustrated), and the CPU 11 executes the control program to control the transmission devices 20A and 20B under the control of the controller 10 and by communication commands (or interrupts). Meanwhile, the main memory 12 is also used as the work area for the CPU 11.

The transmission device 20A includes a CPU 21A, a main memory 22A, and a system bus control circuit 24A which are connected via an internal bus of the transmission device 20A, and a shared memory 23A connected to the system bus control circuit 24A. Moreover, the internal bus of the transmission device 20A is connected a LAN controller 25A which is connected to a transmission channel 40A such as a LAN (Local Area Network) to control transmission to and from the transmission channel 40A.

The transmission device 20B includes a CPU 21B, a main memory 22B, and a system bus control circuit 24B which are connected via an internal bus of the transmission device 20B, and a shared memory 23B connected to the system bus control circuit 24B. Moreover, the internal bus of the transmission device 20B is connected to a transmission control ASIC (Application Specific Integrated Circuit) 25B which is connected to an arbitrary transmission channel 40B to control transmission to and from the transmission channel 40B.

The CPU 21A and the main memory 22A in the transmission device 20A as well as the CPU 21B and the main memory 22B in the transmission device 20B function as a so-called computer and haves the function to perform operations independent of the controller 10 or asynchronously perform operations according to communication commands from the controller 10. The system bus control circuits 24A and 24B of the transmission devices 20A and 20B function to receive interrupts via the system bus 30 and issue interrupts with respect to the connected CPUs 21A and 21B, respectively. Then, the CPUs 21A and 21B perform operations corresponding to the interrupts. The main memories 22A and 22B of the transmission devices 20A and 20B are also used as buffer memories (reception buffers) for storing incoming data sent from external devices (not illustrated) via the transmission channels 40A and 40B, respectively.

Figure 2:
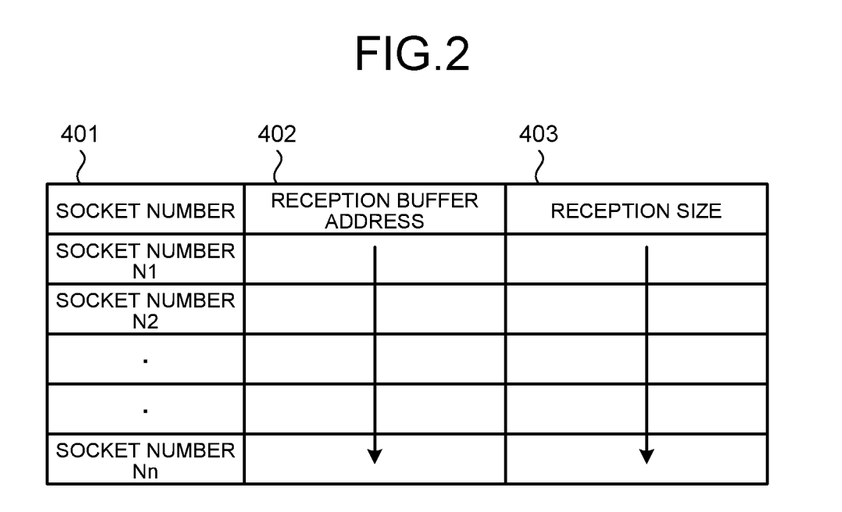
FIG. 2 is a diagram illustrating socket information according to the first embodiment by way of example.

Meanwhile, the transmission device 20A and the transmission device 20B each include a table containing, as socket information, a reception buffer address (i.e., the address of a reception buffer) and a reception size (i.e., the size of incoming data) that are set for each external device and associated with a socket number. As illustrated in FIG. 2, the table is made of a socket number field 401, a reception buffer address field 402, and a reception size field 403. Herein, the socket number represents, for example, a number associated with the IP address and the port number of a sender of incoming data as well as associated with the IP address and the port number of the concerned transmission device. The controller 10 makes use of the socket numbers to specify incoming data from particular senders as received by the transmission devices 20A and 20B.

The reception buffer address set for the socket information can be pre-defined or can be dynamically defined by the CPU according to a condition of the system resources. Regarding the reception buffer address field of the socket information, the initial value is set to a value (hereinafter, set to "0") indicating no set reception buffer address. When the transmission device 20A or the transmission device 20B receives incoming data, the CPU 21A or the CPU 21B sets a reception buffer address in the reception buffer address field 402 of the socket information corresponding to a destination of the incoming data.

Regarding the reception size, the CPU 21A or the CPU 21B sets the size of incoming data, which is actually received by the corresponding transmission device, in the reception size field 403 of the socket information corresponding to a destination of the incoming data.

Given below is the explanation of the operations performed by the transmission devices 20A and 20B. The following will exemplify only the transmission device 20A.

(Receiving Incoming Data)

The transmission device 20A receives incoming data from an external device via the transmission channel 40A and stores the data in a reception buffer corresponding to the external device. Since the transmission device 20A holds the socket information (see FIG. 2), it can store the incoming data in the reception buffer designated by a reception buffer address in the socket information corresponding to a destination of the incoming data, referring to the socket information.

(Receiving Reception Request from Controller)

Upon issuance of a reception request as a communication command from the controller 10 to the transmission device 20A, a reception module of the transmission device 20A, which represents one of the processing modules and is executed by the CPU 21A, is notified about the reception request. The operations performed by the reception processing module include reception processing (first-half) illustrated in FIG. 3 and reception processing (second-half) illustrated in FIG. 4.

Figure 3:
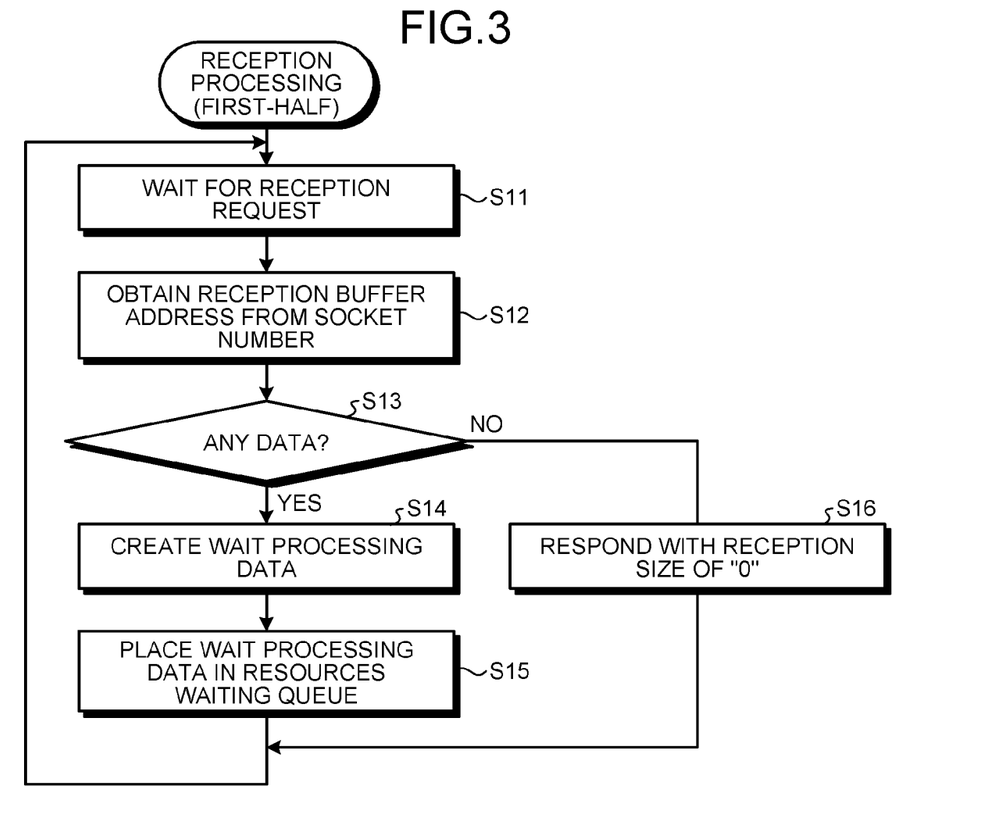
FIG. 3 is a flowchart of reception processing (first-half) according to the first embodiment.

When receiving a notice of the reception request, the reception processing module executed by the CPU 21A proceeds from a reception request waiting (S11) to the next operation at S12.

Figure 5:
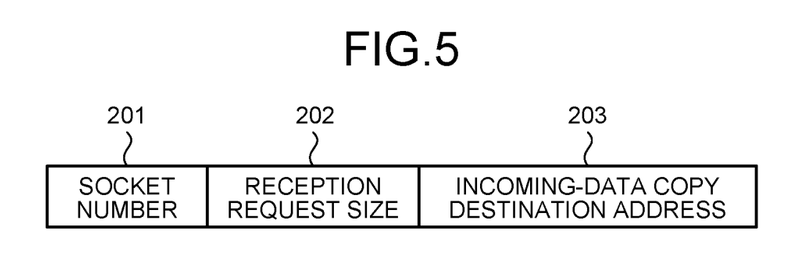
FIG. 5 is a diagram illustrating a data structure of a reception request parameter according to the first embodiment.

The CPU 21A extracts a socket number 201 from a parameter (reception request parameter in FIG. 5) contained in the reception request and searches the socket number field 401 of the socket information illustrated in FIG. 2 for the one matching the socket number 201 extracted from the reception request parameter. Then, the CPU 21A obtains the reception buffer address of the matching socket number from the socket information (S12). In FIG. 5, the request reception parameter includes the socket number 201, a reception request size 202, and an incoming-data copy destination address 203 by way of example.

At S12, when the reception buffer address is not stored in the reception buffer address field 402 of the socket information corresponding to the socket number designated by the controller 10 (i.e., the initial value still remains "0"), the CPU 21A determines no data reception (No at S13) and provides a response of reception size "0" to the controller 10 (S16).

Figure 6:
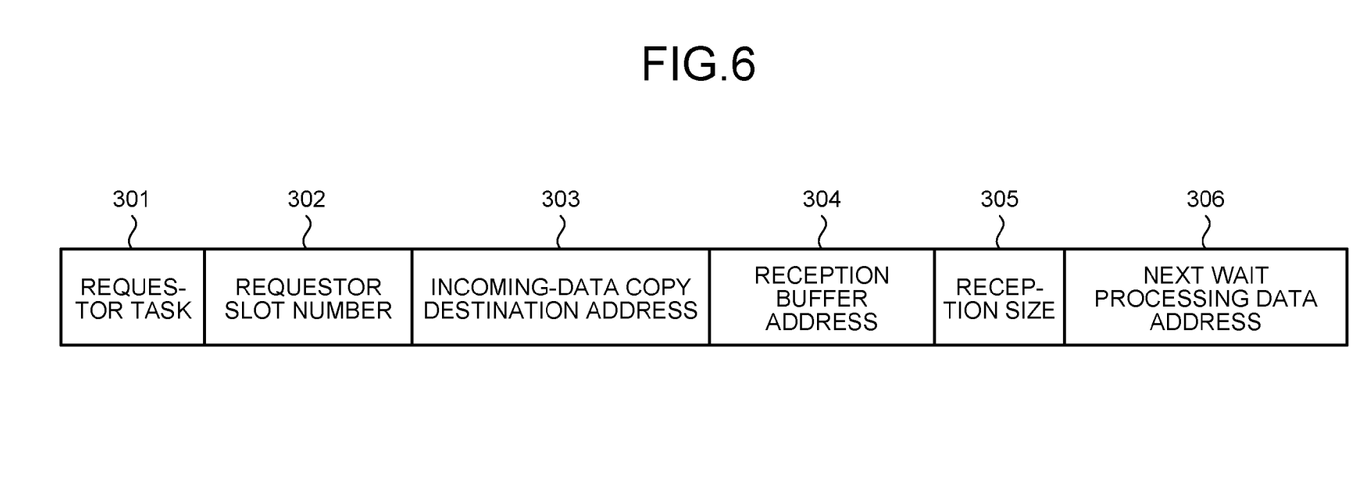
FIG. 6 is a diagram illustrating a data structure of wait processing data according to the first embodiment.
Figure 7:
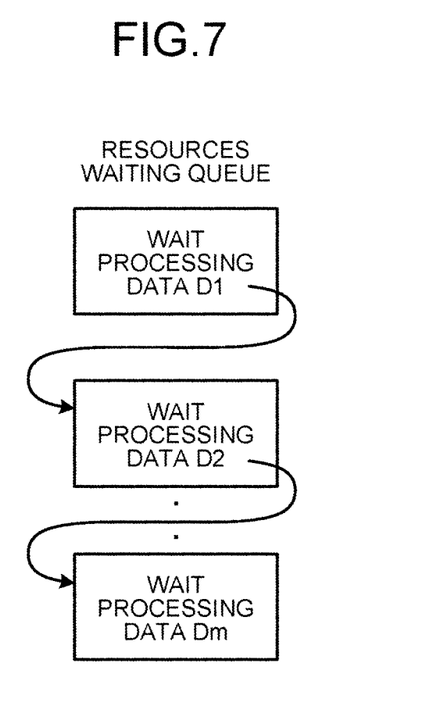
FIG. 7 is a conceptual diagram illustrating a resources waiting queue according to the first embodiment.

On the other hand, when a reception buffer address is stored in the reception buffer address field 402 of the socket information corresponding to the socket number designated by the controller 10, the CPU 21A determines receipt of incoming data (Yes at S13) and proceeds to S14. At S14, the CPU 21A creates wait processing data. More particularly, the CPU 21A stores information to identify a task of the requestor of a reception request in a requestor task field 301 of wait processing data illustrated in FIG. 6, stores, in a requestor slot number field 302, a slot number as information to specify the controller 10 serving as the requestor controller of a reception request, stores, in an incoming-data copy destination address field 303, an incoming-data copy destination address of a reception request parameter, stores, in a reception buffer address field 304, a reception buffer address in the socket information corresponding to the socket number of the reception request parameter, stores, in a reception size field 305, the reception size in the socket information corresponding to the socket number of the reception request parameter, and stores, in a next wait processing data address field 306, the initial address of an area of a resources waiting queue, the area in which next wait processing data is stored. Thereby, wait processing data is created. Herein, the resources waiting queue includes a group of areas designated by subsequent wait processing data addresses (see the conceptual diagram illustrated in FIG. 7) in the memory space of the main memory. However, it should not be limited thereto.

Then, the CPU 21A places the created wait processing data in an area of the resources waiting queue designated by a next wait processing data address in the wait processing data that is previously stored in the resources waiting queue (S15), and returns to S11 to wait for the next reception request (S11). While waiting for the reception request (S11), the CPU 21A proceeds to another arbitrary operation. Meanwhile, if there is no previously stored wait processing data in the resources waiting queue at the initial stage of placing the wait processing data in the resources wait processing queue, a predetermined next wait processing data address is used.

When receiving, as an interrupt, a notice of the availability of shared system resources (i.e., a notice informing that the shared system resources are now available for the transmission device 20A), the CPU 21A suspends a running operation and promptly resumes the withheld reception processing (second-half) (FIG. 4) of the reception processing module. The notice of the availability of shared system resources is issued from the controller 10 to the transmission device 20A when the controller 10 has issued a reception request to the transmission device 20A and is not using the shared system resources. If the controller 10 has not issued a reception request to the transmission device 20A (including the case in which the transmission device 20A has finished an operation in response to a reception request), the controller 10 does not issue the notice regardless of non-use of the shared system resources.

Figure 4:
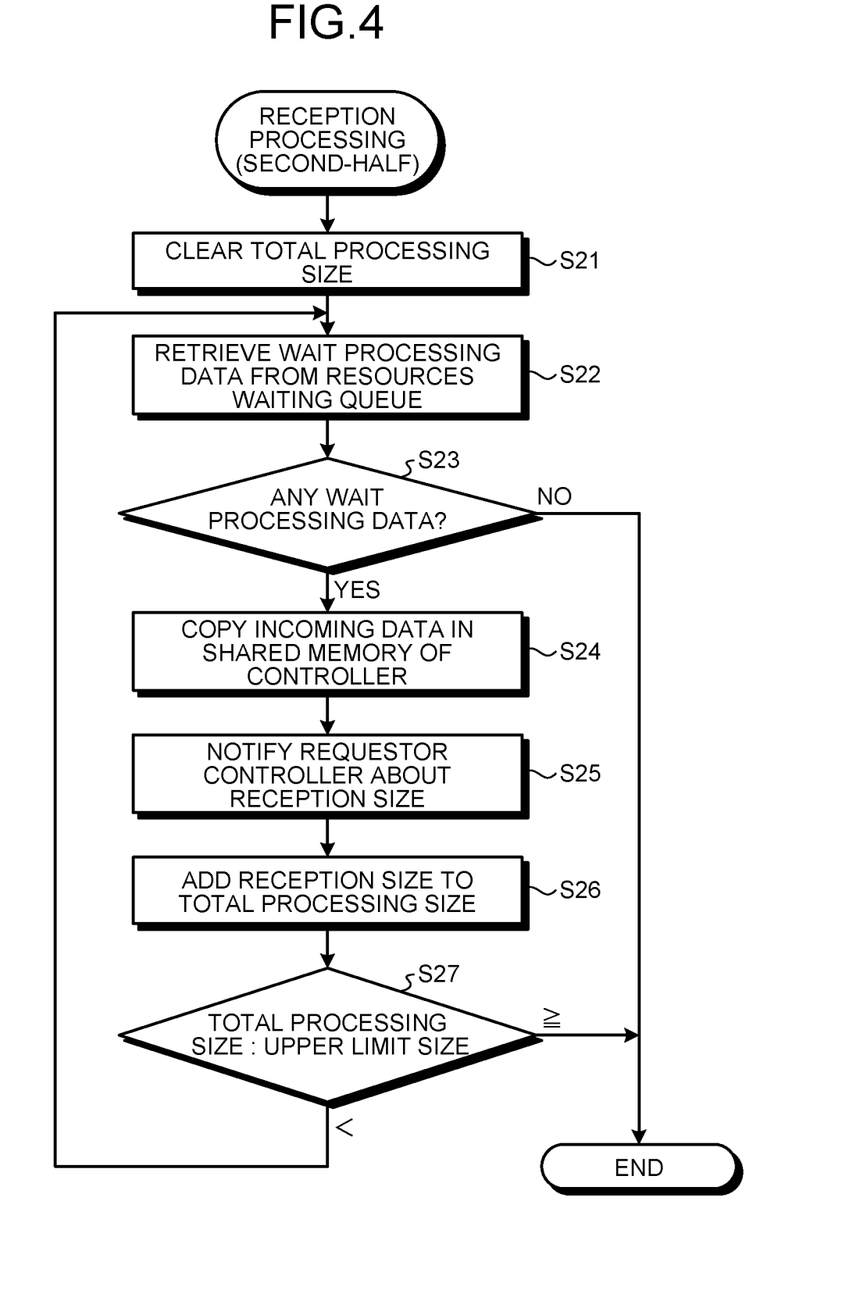
FIG. 4 is a flowchart of the reception processing (second-half) according to the first embodiment.

Next, with reference to FIG. 4, a description will be made on the reception processing (second-half) performed in synchronization with the issuance of a notice of the availability of shared system resources from the controller 10.

When the transmission device 20A is notified about the availability of shared system resources in the form of an interrupt from the controller 10 via the system bus 30, the CPU 21A promptly performs the reception processing (second-half).

Firstly, the CPU 21A clears the total processing size that is used in determining the upper limit of continuous-processing size (S21).

Then, the CPU 21A retrieves, from the resources waiting queue, the withheld wait processing data that is initially placed in the resources waiting queue (S22).

If no wait processing data is stored therein (No at S23), the CPU 21A ends the processing.

When wait processing data is stored in the resources waiting queue (Yes at S23), the CPU 21A copies, on the basis of the retrieved wait processing data, stored incoming data of the size indicated by the reception size field 305 from the address position of the reception buffer designated in the reception buffer address field 304, on an area of the shared memory 13 of the controller 10, the area which is designated by the address stored in the incoming-data copy destination address field 303 (see a reference numeral 101 illustrated in FIG. 1) (S24). If the parameter contained in the reception request from the controller 10 includes the reception size, the CPU 21A copies the incoming data according to the reception size. Subsequently, based on the information in the requestor task field 301 and the requestor slot number field 302 of the wait processing data, the CPU 21A notifies the task of the requestor controller 10 about the reception size and completion of the copying (S25).

Then, the CPU 21A adds the reception size (305) of the copied incoming data to the total processing size (S26).

When the total processing size is equal to or greater than at S27) the upper limit size in the upper limit determination of the continuous-processing size (S27), the CPU 21A ends the reception processing (second-half). Meanwhile, if the transmission device 20A is still running the operation in response to the reception request, the controller 10 issues a notice of the availability of system resources at the next timing at which the shared system resources become available. In the first embodiment, the upper limit size is considered to be pre-defined according to the system configuration.

When the total processing size is smaller than (< at S27) the upper limit size in the upper limit determination of the continuous-processing size (S27), the CPU 21A returns to S22 to retrieve next withheld wait processing data from the resources waiting queue (S22) and repeats the operations from S23 onward.

The transmission device 20A (20B) and the controller 10 operate in the above-described manner. Therefore, the controller 10 does not face a waiting time, which will otherwise occur in the conventional system due to the use of the shared system resources including the system bus 30 and the shared memories 13, 23A, and 23B by the transmission device 20A (20B) irrespective of the task execution by the controller 10.

Figure 8:
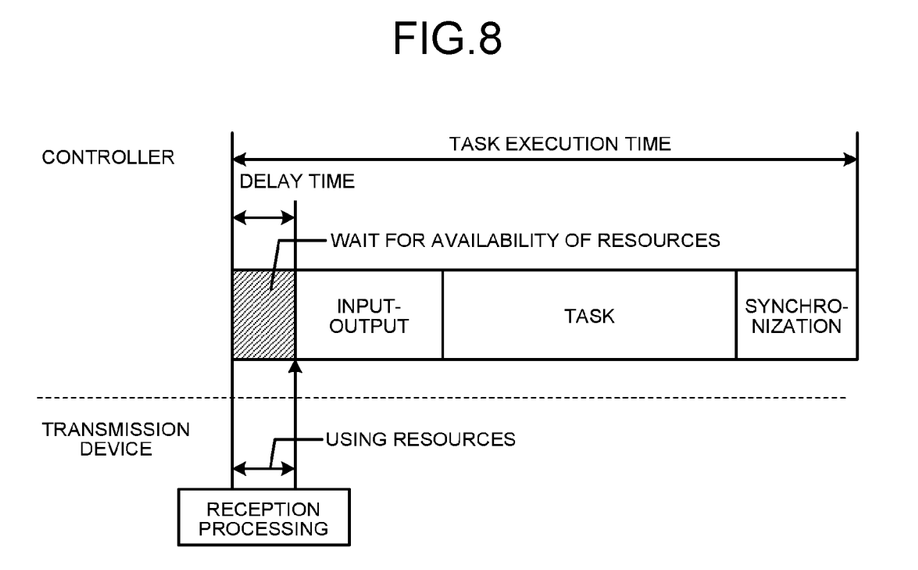
FIG. 8 is a diagram illustrating occurrence of a delay in a conventional method.

Thus, the controller 10 does not delay the task execution. Meanwhile, conventionally, as illustrated in FIG. 8, the task execution by a controller may be delayed by a waiting time for the resources to become available.

Second Embodiment

In the first embodiment, in the reception processing (second-half), after completing the retrieval of wait processing data from the resources waiting queue, the CPU 21A determines the upper limit of the continuous-processing size (S27). The upper limit used in the determination should be varied according to the operating environment of the system 1. In a second embodiment, the transmission devices 20A and 20B hold the upper limit size as a variable. When receiving a notice for varying the upper limit size as a communication command from the controller 10, the CPUs 21A and 21B of the transmission devices 20A and 20B vary the upper limit size, which is used in determining the upper limit of the continuous-processing size, to a commanded value. By setting the upper limit size to be dynamically variable, the transmission devices 20A and 20B can deal with variations in the operating environment of the system. Note that the rest of the configuration of the second embodiment is identical to that of the first embodiment.

Third Embodiment

The first and second embodiments are configured such that the controller 10 mainly adjusts the timing at which the transmission devices 20A and 20B respond to the reception request from the controller 10 by issuing the notice of the availability of shared system resources. However, there may be a case where the transmission device 20A or the transmission device 20B has to request the controller 10 to perform necessary operations, because some event occurs on the transmission device 20A or 20B side (for example, receipt of a request from a device other than the controller 10). According to the first and second embodiments, while the transmission devices 20A and 20B are not running the reception processing in response to a request from the controller 10, the controller 10 does not issue a notice of the availability of shared system resources. In this regard, in a third embodiment, in order to receive a notice of the availability of shared system resources from the controller 10 in such a situation, the transmission devices 20A and 20B are configured to request the controller 10 to start issuing an availability notice regarding the shared system resources. Upon receiving the availability notice start request regarding the shared system resources from the transmission devices 20A and 20B, the controller 10 continuously issues a notice of the availability of shared system resources regardless of the presence or absence of running reception processing in response to a request.

Moreover, in the third embodiment, in order to stop the continuous issuance of the notice of the availability of shared system resources in response to the availability notice start request regarding shared system resources, the transmission devices 20A and 20B request the controller 10 for stopping the availability notice regarding shared system resources. Upon receiving the availability notice stop request regarding the shared system resources from the transmission devices 20A and 20B, the controller 10 stops issuing the notice of the availability of shared system resources. Meanwhile, the availability notice start request and the availability notice stop request regarding the shared system resources can be issued in an arbitrary form such as in the form of interrupts. In this way, even while running no reception processing in response to a request from the controller, the transmission devices can request the controller to perform necessary operations.

As described above, according to the first to third embodiments, it is possible to reduce an overlap in the respective timings at which the transmission device and the controller occupy the shared system resources during the operations (reception processing and making a copy on a shared memory accompanying the reception processing) of the transmission device and reduce the delay in the task execution of the controller attributed to the waiting for the shared system resources to become available. Thus, the controller can execute its own tasks without a delay, unaffected by the operations of the transmission device.

While certain embodiments of the invention have been described, the embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

What is claimed is:

1. A transmission device connected to a controller via a system bus, the transmission device comprising:
   a system bus processor that controls transmission via the system bus;
   an external transmission control circuit that controls data transmission among the transmission device, the controller, and an external transmission channel not of the system bus;
   a memory in which data received via the external transmission channel is stored; and
   a central processing unit that not performs but withholds an operation involving a use of shared system resources including the system bus, and
   when notified of an availability of the shared system resources from the controller, performs the withheld operation involving a use of the shared system resources,
   when withholding the operation involving a use of shared system resources, stores information on the operation concerned and proceeds to another operation, and
   when receiving a notice of timing at which the shared system resources become available, promptly resumes the withheld operation involving a use of the shared system resources based on the stored information, and transmits data, among the stored data, requested by the controller from the memory to a location designated by the controller via the system bus, using the shared system resources.

2. The transmission device according to claim 1, wherein:
   for the transmission of the data designated by the controller to the location designated by the controller via the system bus, an upper limit value of data size for continuous transmission is set in advance, and
   when a size of the data transmitted to the controller reaches the upper limit value, the central processing unit withholds a remaining operation.

3. The transmission device according to claim 2, wherein the central processing unit holds the upper limit value as a variable, and when receiving an instruction to vary the upper limit value from the controller, dynamically varies the upper limit value to an instructed value.

4. The transmission device according to claim 1, wherein the central processing unit requests the controller to start issuing a notice of timing at which the shared system resources become available and to stop issuing the notice of the timing having started in response to the start request, when needed.

5. A controller connected, via a system bus, to a transmission device which includes
   a system bus control processor that controls transmission via the system bus,
   an external transmission control circuit that controls data transmission among the transmission device, the controller, and an external transmission channel not of the system bus;
   a memory in which data received via the external transmission channel is stored; and
   a central processing unit that not performs but withholds an operation involving a use of shared system resources including the system bus, and
   when notified of an availability of the shared system resources from the controller, performs the withheld operation involving a use of the shared system resources,
   when withholding the operation involving a use of shared system resources, stores information on the operation concerned and proceeds to another operation, and
   when receiving a notice of timing at which the shared system resources become available, promptly resumes the withheld operation involving a use of the shared system resources based on the stored information, and transmits data, among the stored data, requested by the controller from the memory to a location designated by the controller via the system bus, using the shared system resources,
   wherein
   when the controller has requested the transmission device to perform the operation involving a use of the shared system resources and is not using the shared system resources, the controller notifies the transmission device about the availability of the shared system resources.

6. A system comprising a controller and a transmission device connected via a system bus, wherein: the transmission device includes
   a system bus processor that controls transmission via the system bus,
   an external transmission control circuit that controls data transmission among the transmission device, the controller, and an external transmission channel not of the system bus;
   a memory in which data received via the external transmission channel is stored; and
   a central processing unit that not performs but withholds an operation involving a use of shared system resources, and when notified of an availability of the shared system resources from the controller, performs the withheld operation involving a use of the shared system resources including the system bus, and
   when withholding the operation involving a use of shared system resources, stores information on the operation concerned and proceeds to another operation, and
   when receiving a notice of timing at which the shared system resources become available, promptly resumes the withheld operation involving a use of the shared system resources based on the stored information, and transmits data, among the stored data, requested by the controller from the memory to a location designated by the controller via the system bus, using the shared system resources, wherein when the controller has requested the transmission device to perform the operation involving a use of the shared system resources and is not using the shared system resources, the controller notifies the transmission device about the availability of the shared system resources.

\* \* \* \* \*